United States Patent [19]

McDuffie et al.

[11] 4,266,391
[45] May 12, 1981

[54] HEADER ATTACHMENT MECHANISM FOR COMBINES

[75] Inventors: James W. McDuffie; Larimer J. Knepper; Larimer J. Knipper, all of New Holland, Pa.

[73] Assignee: Sperry Corporation, New Holland, Pa.

[21] Appl. No.: 91,436

[22] Filed: Nov. 5, 1979

[51] Int. Cl.³ .............................................. A01D 41/02
[52] U.S. Cl. ................................. 56/14.5; 56/DIG. 9
[58] Field of Search ...................... 56/14.5, 14.6, 15.5, 56/DIG. 9, 208, 209

[56] References Cited

U.S. PATENT DOCUMENTS

| | | | |
|---|---|---|---|
| 3,306,014 | 2/1967 | Halls et al. | 56/208 |
| 3,559,384 | 2/1971 | Bernhardt et al. | 56/14.6 |
| 3,638,407 | 2/1972 | Togami | 56/DIG. 9 |
| 3,699,753 | 10/1972 | Peak | 56/14.5 |
| 3,731,470 | 5/1973 | Cornish et al. | 56/208 |
| 3,981,125 | 9/1976 | Kerber et al. | 56/14.5 |
| 4,206,583 | 6/1980 | Week et al. | 56/15.8 |

*Primary Examiner*—Robert A. Hafer
*Attorney, Agent, or Firm*—Larry W. Miller; Frank A. Seemar; James R. Beil

[57] ABSTRACT

A header attachment mechanism for a combine is disclosed wherein a front face member is rotatably attached to the forward end of the feeder house for movement in a fore-and-aft direction and a cradle assembly is pivotally attached to the front face member for rotation generally about the line of travel in a substantially transversely extending plane. By connecting the header to this attachment mechanism, the header can be both adjusted to laterally float relative to the contour of the ground and adjusted to change the cutting angle of the header cutting means relative to the ground through manipulation of the rotation of the cradle assembly and front face member respectively.

40 Claims, 6 Drawing Figures

HEADER ATTACHMENT MECHANISM FOR COMBINES

BACKGROUND OF THE INVENTION

The present invention relates generally to crop harvesting machines, commonly referred to as combines, and, more particularly, to providing a header attachment mechanism which will give flexibility to adjusting the position of the header relative to the ground.

Combines, particularly the self-propelled type, are equipped to utilize a variety of crop gathering headers, including headers specifically designed for harvesting corn, cereal grains or soy beans. Normally, these headers are attached to the forward end of the feeder house, which is a structure used to convey crop material from the header to the combine base unit for further harvesting treatment. As is shown in U.S. Pat. No. Re. 26,512, the forward end of the feeder house can be constructed so that the header can be quickly and easily attached thereto. Usually, the feeder house structure is rectangular in shape and includes a rectangular crop inlet opening at the forward end.

Providing the capability for a combine header to both rotate laterally, to follow the contour of the ground, and to rotate in a fore-and-aft direction, to adjust the cutting angle of the header cutting means relative to the ground, has become increasingly desirable. As can be seen in U.S. Pat. No. 3,981,125, U.S. Pat. No. 3,731,470, U.S. Pat. No. 3,638,407 and U.S. Pat. No. 3,474,606, various structures have been developed to provide either one function or the other. Problems with the prior art structures include increased crop losses occurring with header adjustments, increased wear and short life of the feeder house components and feeding problems with the crop conveying means within the feeder house.

Changing the cutting angle of the header cutting means relative to the ground is particularly important for the harvest of soy beans, as the grain portion of this crop lies closer to the ground than for other crops. Furthermore, since changing tire sizes on the combine causes changes in the aforementioned cutting angle, it is of further importance to provide such a capability to correct such cutting angle changes. Since it has been found that an increase in the distance between the header and the crop conveying means will detrimentally affect the efficiency of the feeder house crop conveying means to engage crop material to feed it rearwardly, it is particularly advantageous to provide the capability of adjusting the cutting angle without increasing this header to crop conveying means distance.

Lateral flotation of the header has an increasingly greater importance with the increasing sizes of crop gathering headers because the larger headers are more susceptible to changes in the ground contour in that a ground contour change could result in one end of the header being above the crop material with no crop being harvested. To provide the header with the capability to float, and thereby follow the ground contour, enables the header to gather more crop material and reduce losses. Twisting the feeder house to laterally move the header creates many of the aforementioned problems which the present invention attempts to avoid.

SUMMARY OF THE INVENTION

It is an object of this invention to overcome the aforementioned disadvantages of the prior art by providing an improved header attachment mechanism for attaching the header to the forward end of a combine feeder house.

It is a feature of this invention to be able to achieve the optimum cutting angle relative to the ground regardless of the size of tires used on the combine.

It is another object of this invention to provide a header attachment mechanism which can vary the cutting angle of the header relative to the ground without increasing the distance between the header and the crop conveying means located within the combine feeder house.

It is an advantage of this invention to provide a header attachment mechanism for a combine which can change the cutting angle of the header without impairing the efficiency of the crop conveying means within the combine feeder house to engage crop material and transport it rearwardly.

It is a still another object of this invention to provide a simple means to selectively stabilize, restrict and control the rotation of a front face member rotatably attached to the forward end of a combine feeder house for changing the cutting angle of the header relative to the ground.

It is another feature of this invention to provide a simple means for allowing the combine header to float laterally to follow the contour of the ground.

It is another advantage of this invention to increase the life of the feeder house drive by reducing the amount of twisting necessary in the feeder house to provide a lateral float capability.

It is a further object of this invention to reduce sealing problems between the feeder house and the combine base unit.

It is a still further object of this invention to provide a header attachment mechanism which will be flexible with regard to adjusting the position of the header cutting means relative to the ground in both a lateral direction and a rotative fore-and-aft direction.

It is a still further object of this invention to provide a header attachment mechanism for a combine which is durable in construction, inexpensive of manufacture, facile in assemblage, multi-purpose in function and simple and effective in use.

These and other objects, features and advantages are accomplished according to the instant invention by providing a header attachment mechanism for a combine wherein a front face member is rotatably attached to the forward end of the feeder house for movement in a fore-and-aft direction and a cradle assembly is pivotally attached to the front face member for rotation generally about the line of travel in a substantially transversely extending plane. By connecting the header to the attachment mechanism, the header can be both adjusted to laterally float relative to the contour of the ground and adjusted to change the cutting angle of header cutting means relative to the ground through manipulation of the rotation of the cradle assembly and front face member respectively.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
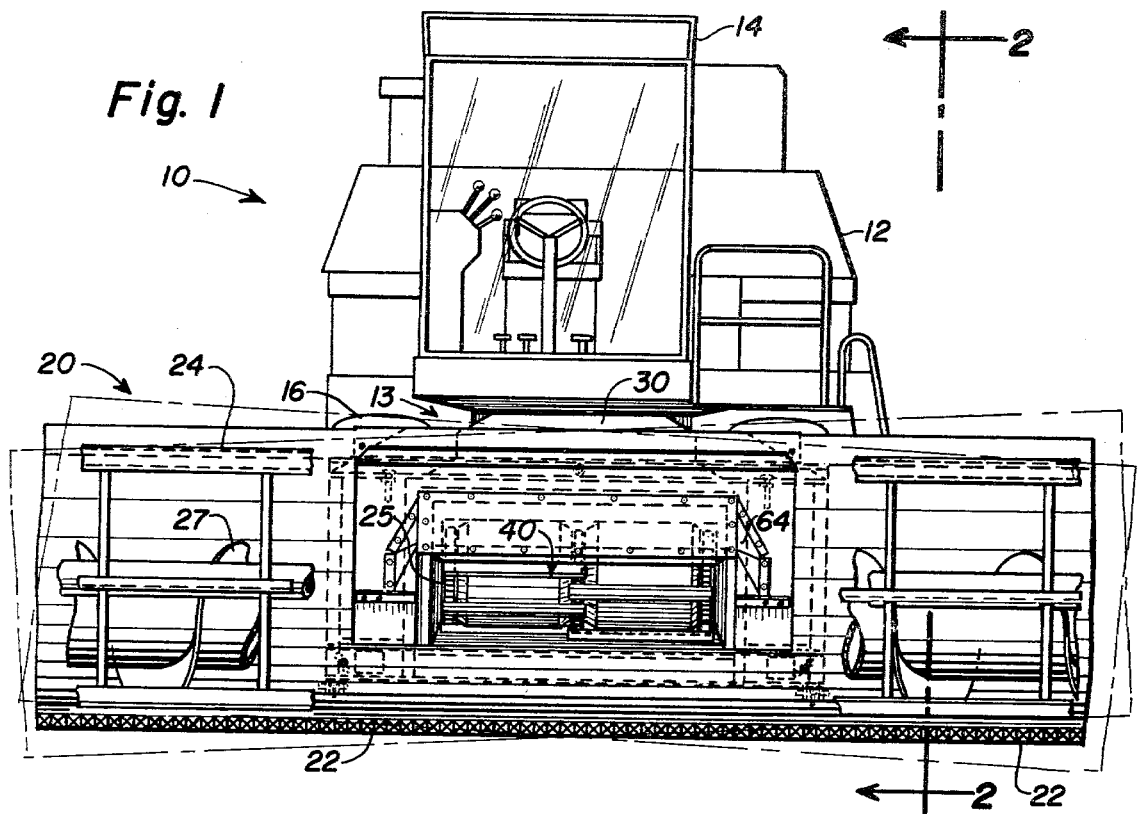
FIG. 1 is a front elevational view of a self-propelled combine, having a grain header attached thereto, incorporating the principles of the present invention.

Referring now to the drawings and particularly to FIG. 1, a front elevational view of the crop harvesting machine commonly referred to as a self-propelled combine can be seen. Left and right references are used as a matter of convenience and are determined by standing at the rear of the machine facing the forward end, the direction of travel. This combine 10 is generally comprised of a base unit 12, including a crop harvesting means 13 for separating the desired crop material from the waste crop material, a detachable crop gathering header 20 located forwardly of the base unit 12, a cab 14 elevated above the header 20 for full view of the crop harvesting process occurring therein, a wheeled frame 16 and a feeder house 30 for conveying crop material harvested by the header 20 rearwardly to the base unit 12 for treatment by the crop harvesting means 13, which, for example, can be a conventional threshing unit or the more recently developed rotary tape axial flow harvesting unit, as is depicted in the drawings.

Figure 2:
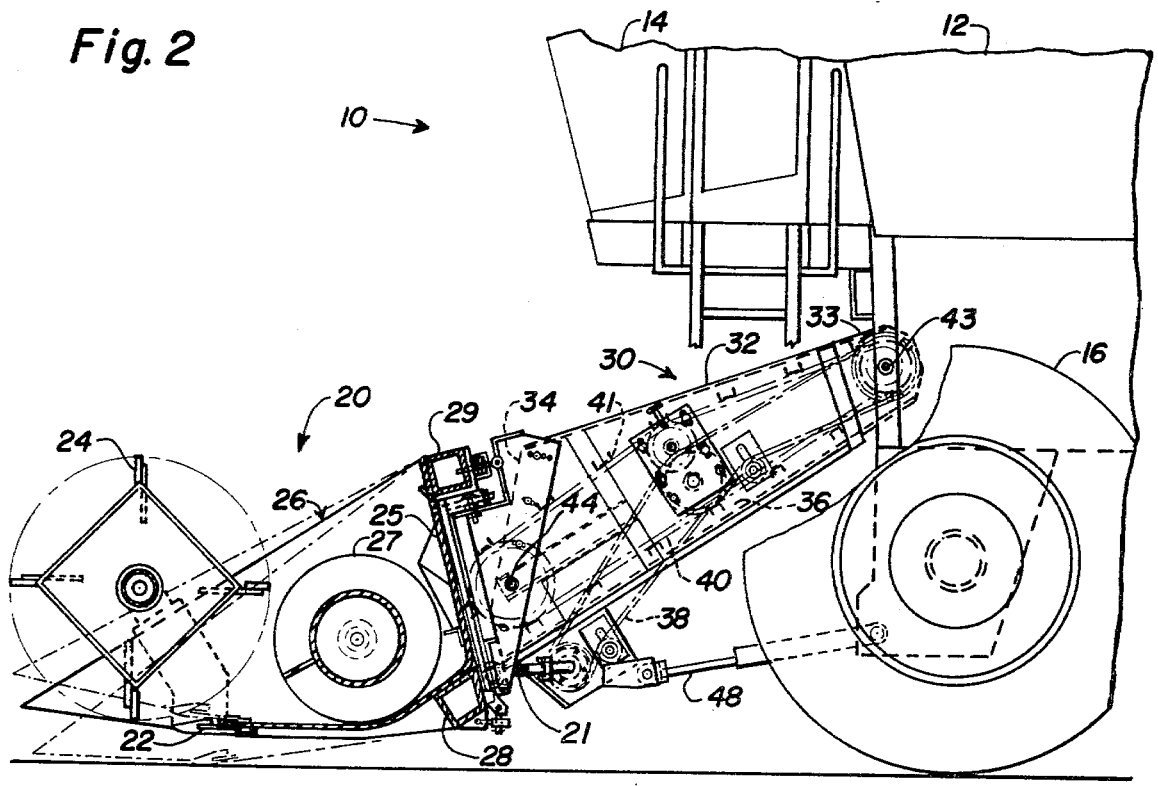
FIG. 2 is a cross sectional view of the forward portion of the combine, including the header and feeder house areas, shown in FIG. 1 taken along line 2—2.

Referring now to the cross sectional view of FIG. 2, a more detailed view of the general inner workings between the header 20, feeder house 30 and base unit 12 can be seen. The header 20 includes a forwardly disposed crop cutting means 22, seen in FIG. 2 in the form of a reciprocating type mower, for severing crop material from the ground. A reel 24 is disposed above and forwardly of the cutter means 22 to sweep crop material over the cutting means 22 and transport it rearwardly to the consolidating means 26, seen in the form of a consolidating auger 27. The consolidating auger 27 converges crop material towards a centrally disposed crop discharge opening 25, better seen in FIG. 1, for discharge to the feeder house structure 30.

As will be discussed hereinafter, varying the angle of the cutting means 22 relative to the ground, as can be seen in phantom in FIG. 2, is important to the efficiency of the crop gathering header, relative to loss of crop material in different types of crops. The frame 28 of header 20 includes a transversely disposed main header beam 29, which is used to support the header 20 from the feeder house 30. One skilled in the art will readily realize that this invention is not limited to a cutting means 22 of the reciprocating type nor a consolidating means 26 in the form of a consolidating auger 27.

As can also be seen in FIG. 2, the feeder house 30 generally includes a forwardly disposed, elongated body portion 32 defined by a rearward end 33 pivotably attached to the base unit 12 and a forward end 34 adjacent the header 20 for connection thereto. The body portion 32 includes a passageway 36 therethrough, terminating in a crop inlet opening 39 at the forward end 34, for allowing crop material to be transported rearwardly from the forward end 34 to the rearward end 33. A crop conveying means 40, normally in the form of an endless chain and slat apron conveyor 41, is positioned within the passageway 36 for transporting the crop material rearwardly. Generally, the apron conveyor 41 is driven by a drive shaft 43 positioned at the rearward end 33. A driven shaft 44 adjacent the forward end 34 enables the endless apron conveyor 41 to rotate into an operative position for transporting crop material rearwardly.

A crop conveyor drive means 38, which receives rotational power from the header drive shaft 21, is also found mounted on the feeder house 30. The height of the header 20 relative to the ground is controlled by a header lift means 48 interconnecting the feeder house 30 and the base unit 12. By extending the header lift means 48 and pivoting the rearward end 33 of the feeder house 30 about the drive shaft 43, thereby rotating the feeder house 30 about the drive shaft 43, the header 20 can be lifted from the ground without significantly changing the discharge point of the apron conveyor 41 relative to the base unit 12.

Figure 4:
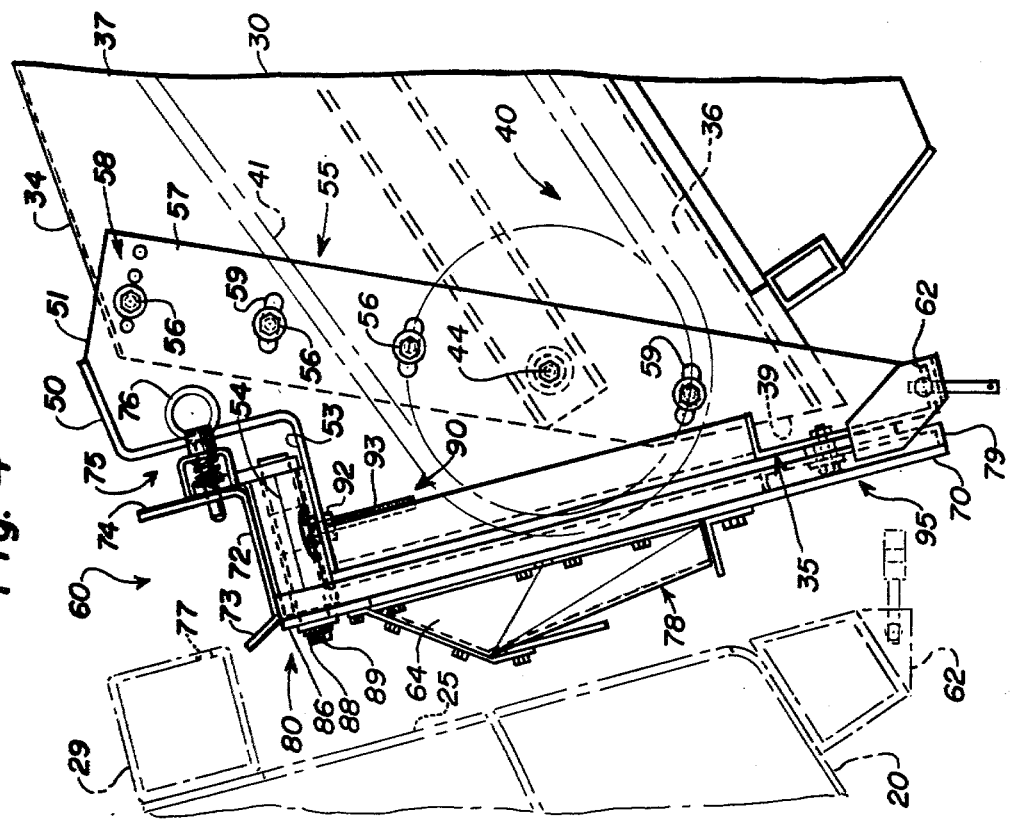
FIG. 4 is a side elevational view of the forward portion of the feeder house showing the front face member and the cradle assembly, the detachable header being shown in phantom proximate to the cradle assembly.

Referring now to FIG. 4, an enlarged view of the forward end 34, showing the front face member 50 and a detached header 20 in phantom proximate thereto, can be seen. The front face member 50 is a separate structure pivotably attached to the forward end 34 of the feeder house 30 for rotational movement such that the top 51 of the front face member 50 is movable in a fore-and-aft direction. The front face member 50 includes an offset section 53 substantially registrable with the main header beam 29 for supporting the header 20 in a detachable operable position.

Although it is possible to attach the front face member 50 to the feeder house 30 without having a fixed pivot point, it has been found to be preferable to use the axis defined by the driven shaft 44 of the conveying means 40 as a fixed pivot point. By such an arrangement, since the distance between the discharge opening 25 and the conveying means 40 is fixed, the efficiency of the crop conveying means 40 to engage the crop material discharged by the header and to convey it rearwardly is not impaired by rotation of the front face member 50.

The front face member 50 includes side sheets 57 which project rearwardly in close proximity to the sidewalls 37 of the feeder house 30. The side sheets 57 include a plurality of multi-positionable apertures 58, which can also be in the form of slot-shaped apertures 59. These apertures 58, 59 are registrable with holes (not shown) in the sidewalls 37. Bolts 56, interfitting corresponding apertures and holes serve to restrict and control the extent of movement of the front face member 50 and to act as a stabilizing means 55.

Figure 3:
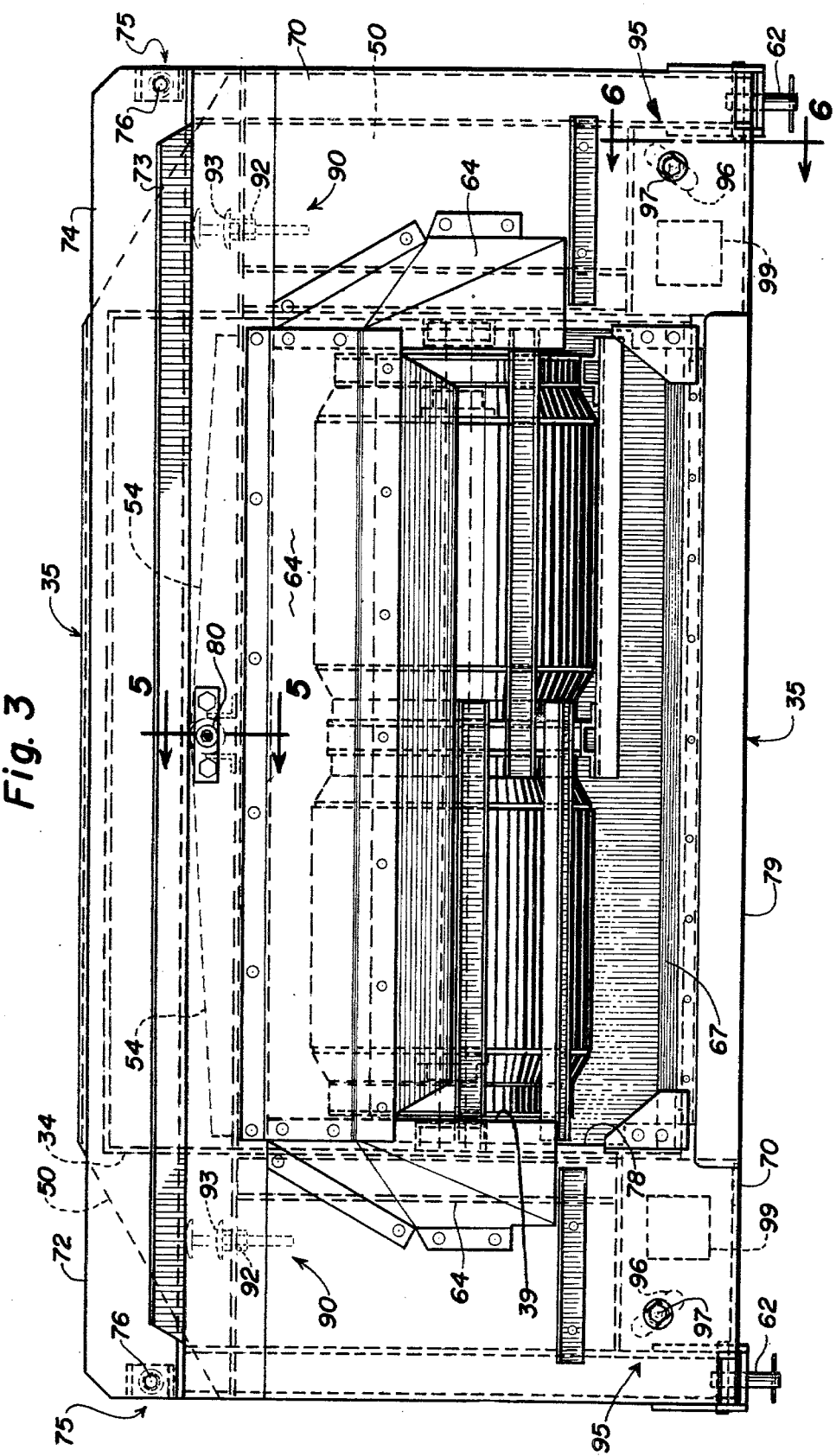
FIG. 3 is an enlarged front elevational view of the cradle assembly at the forward end of the feeder house, the header being removed for clarity.

The lateral float mechanism 60 can be best seen in FIGS. 3 and 4. A separate cradle assembly 70 is pivotably affixed to the forward end 34 of the feeder house 30 for rotation generally about the direction of travel. In the preferred embodiment seen in FIGS. 3 and 4, the cradle assembly 70 is pivotably affixed to the center of the offset section 53 in the front face member 50 by a pivot means 80; however, the cradle assembly 70 could instead be attached to the forward end 34 of the feeder house 30. For purposes of description, the cradle assembly 70 will hereinafter be referred to as being pivotably affixed to an attachment face 35, which is defined as being that part of the feeder house 30 to which the header 20 is attached.

The cradle assembly 70 includes a crop passage opening 78 which is registrable with both the header discharge opening 25 and the crop inlet opening 39. The cradle assembly 70 also includes a nesting portion 72 which overlaps the offset section 53 of the attachment face 35 for receiving and attaching the main header beam 29. The nesting portion 72 has a preferred substantially U-shaped configuration, as best seen in FIG. 4, with the forward leg 73 being shorter than the rear leg 74 and bent forwardly for facilitating the connection between the main header beam 29 and the nesting portion 72. To either side of the pivot 80, the nesting portion 72 includes a locking means 75 in the form of a spring loaded locking pin 76 which is positioned to interfit within corresponding holes 77 in the main header beam 29 to lock the beam 29 into an operative position, wherein the crop discharge opening 25, the crop passage opening 78 and the crop inlet opening 39 are substantially aligned.

To control the pivotal movement of the cradle assembly 70 about the pivot 80, a pivot control means 90, seen in the form of a screw device 92 to each side of the pivot 80, operates to limit the rotation of the nesting portion 72. The bolts 93, forming part of the screw device 92, are threaded into the offset section 53 of the attachment face 35 and can be adjusted upwardly to restrict the extent of possible rotation of the cradle assembly 70. Moreover, by proper manipulation of the left and right bolts 93 in conjunction with each other, the cradle assembly 70 can be locked into an infinite number of rotated positions within the confines imposed by the physical constraints of the screw device 92 itself. It should be further realized by one skilled in the art that one or more hydraulic cylinders interconnecting either the base unit or the feeder house and the cradle assembly would be effective as a pivot control means. To further limit the pivotal movement of the cradle assembly 70 and to provide support for the nesting portion 72 upon full left or full right rotation, the offset section 53 of the attachment face 35 includes an inclined ramp 54 on each side of the pivot means 80.

A latch mechanism 62 locks the lower end 79 of the cradle assembly 70 to the corresponding portion of the header 20 to further aid in retaining the header 20 in an operative position relative to the cradle assembly 70 and the feeder house 30. Latch mechanism 62 is shown in the preferred embodiment as being of the overcenter variety. The cradle assembly 70 also includes a forwardly projecting crop retention hood 64, which extends into the discharge opening 25 of the header 20 to retain crop material within the feeder house passageway 36.

Figure 5:
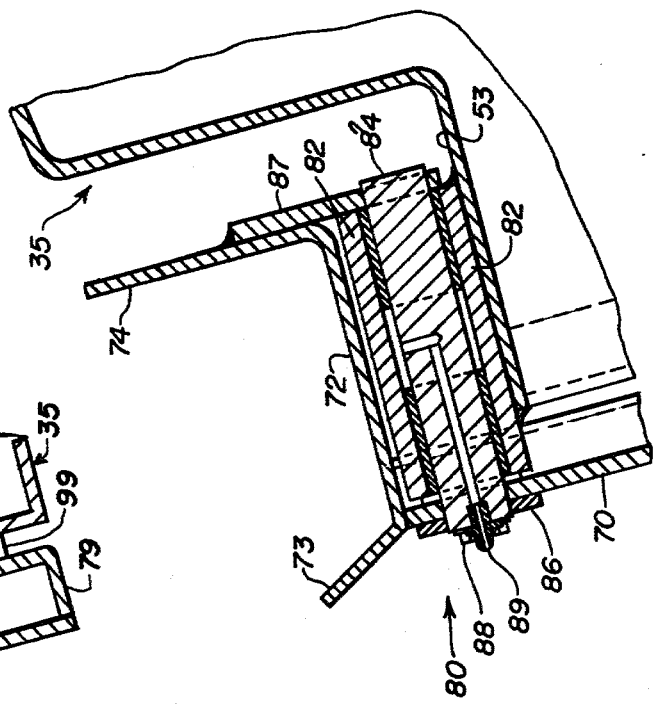
FIG. 5 is a cross sectional view of the cradle assembly pivot means taken along line 5—5 in FIG. 3.

The pivot 80 is best seen in the enlarged view of FIG. 5. A tubular housing 82 is rigidly affixed to the attachment face 35. A circular dowel 84 rotatably extends through the housing 82 and includes a front plate member 86. As is seen in FIG. 3 and FIG. 5, front plate 86 is detachably affixed to the cradle assembly by two screws 88 to facilitate the removal and/or repair of the pivot 80. A rear plate member 87 is rigidly affixed to the rear leg 74 of the nesting portion 72 and is supported by the dowel 84. FIG. 5 reveals the provision of a grease zerk 89 for renewing the supply of lubricant between the dowel 84 and the housing 82. It should be noted that the grease zerk 89 may not be essential; however, it is preferable.

Figure 6:
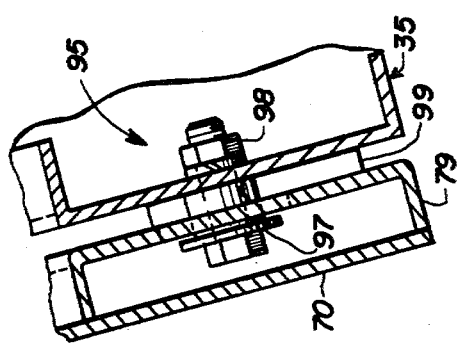
FIG. 6 is a cross sectional view showing the retaining means interconnecting the cradle assembly and a feeder house taken along line 6—6 in FIG. 3.

To keep the cradle assembly 70 from separating from the attachment face 35, particularly at the lower portion 79 thereof, the cradle assembly 70 includes a retaining means 95 interacting between the lower portion 79 of the cradle assembly 70 and the attachment face 35. As can be best seen in FIG. 3 and FIG. 6, the lower portion 79 includes left and right slot shaped holes 96 through which a bolt and washer assembly 97 extends to thread into the attachment face 35, or in the alternative, held in place on the attachment face 35 by a nut 98. The slot shaped holes 96 allow rotation of the cradle assembly 70 while the bolt and washer assembly 97 keeps the cradle assembly 70 in close proximity to the attachment face 35. A spacer 99, shown in the form of a plastic block, keeps the cradle assembly 70 and the attachment face 35 from coming into sliding contact with each other. It should be further realized by one skilled in the art that other forms of spacers, such as a roller, could be similarly used.

To operate the lateral float mechanism 60, the pivot control means 90 is manipulated to effect the desired rotation of the cradle assembly 70 about the pivot means 80. The header 20, being attached to the cradle assembly 70, is rotatable therewith and is positionable to correspond to the slope of the ground. Total rotation of the cradle assembly 70 and attached header 20, from a full left rotation to a full right rotation, is in the range of six to eight degrees, representing approximately $3\frac{1}{2}$ degrees to each side of horizontal. As the cradle assembly 70 is rotated, the crop passage opening 78 therethrough becomes slightly askewed to the crop inlet opening 39 at the beginning of the feeder house passageway 36. To prevent a loss of crop material because of the askewed openings 36, 78 and because of the separation between the cradle assembly 70 and the attachment face 35 due to the presence of the spacer 99, a flexible seal 67, as can be best seen in FIG. 3, extends between the cradle assembly 70 and the front face member 50.

Since different crops require different angles for the cutting means 22 relative to the ground for best cutting efficiency and least crop loss, the cutting means/ground angular relationship can be selectively adjusted by manipulating the stabilizing means 55 such that the front face member 50 is rotated in a fore-and-aft direction, thereby affecting a corresponding angular change between the cutting means 22 and the ground. Providing a pivot point at the axis corresponding to the driven shaft 44 of the endless apron conveyor 41 keeps the header 20 at a constant distance from the endless apron conveyor 41 so that the efficiency of the crop conveying means 40 to engage the crop material and transport it rearwardly is not impaired.

By providing a combine with both a lateral float mechanism 60, in the form of a cradle assembly 70, and a front face member 50, one skilled in the art should readily realize that a very flexible header mounting combination is obtained. Furthermore, an adjustment of the distance between the cutting means 22 and the ground can be easily obtained by manipulation of the header lift means 48 (e.g. extension and retraction of the hydraulic cylinder), which extends between the feeder house 30 and the base unit 12.

It will be understood that various changes in the details, material, steps and arrangement of parts which have been described and illustrated in order to explain the nature of the invention, will occur to and may be made by those skilled in the art upon a reading of the disclosure within the principles and scope of the invention.

Having thus described the invention, what is claimed is:

1. A feeder house extending from a mobile combine base unit for transferring crop material collected by a detachable header to the base unit for further harvesting treatment, the header including a transversely disposed cutting means for severing crop material from the ground and a frame having a transverse main beam for detachably supporting the header from the feeder house, said feeder house comprising:

a frame;

an elongated forwardly extending body portions supported by said frame, said body portion having a forward end adjacent the header, a rearward end adjacent the base unit, a centerline extending between said forward and rearward ends such that said feeder house is substantially equally situated on either side of said centerline, two laterally spaced sidewalls extending between said forward and rearward ends substantially parallel to said centerline, and a passageway extending from said forward end to said rearward end between said sidewalls, said passageway terminating in a crop inlet opening at said forward end and in a crop outlet opening at said rearward end;

a crop conveying means housed within said passageway for transporting crop material rearwardly to the base unit, said crop conveying means including a transverse rotatable shaft member adjacent and substantially parallel to said forward end, said shaft member defining a transverse axis substantially perpendicular to said feeder house centerline, said transverse axis being rearward of said forward end;

a front face member selectively movably attached to said body portion for selective rotative movement in a fore-and-aft direction relative to said body portion, said front face member projecting forwardly for connection to the cradle assembly set forth below such that the angular relationship of the cutting means relative to the ground can be altered by rotatably moving said front face member in a fore-and-aft direction;

a cradle assembly having pivot means pivotably attaching said cradle assembly to said front face member, said cradle assembly having a crop passage opening therethrough substantially registered with said crop inlet opening, said cradle assembly including a header connecting means for attaching the header to said cradle assembly to prevent relative movement therebetween, a retaining means cooperable with said front face member to prevent relative fore-and-aft movement therebetween while allowing pivotal movement of said cradle assembly in a substantially vertical plane and a pivot control means cooperatively associated with said cradle assembly and said front face member for selectively controlling the extent of pivotal movement therebetween; and drive means for driving said crop conveying means.

2. The feeder house of claim 1 wherein said front face member includes a stabilizing means for selectively controlling the extent of rotational movement thereof.

3. The feeder house of claim 2 wherein said sidewalls include at least one hole therein, said front face member having side sheets extending rearwardly along said sidewalls, said side sheets having a plurality of apertures therein registerable with and corresponding to said at least one hole in said sidewall, said stabilizing means including a bolt interconnecting said at least one hole and the respective corresponding aperture to selectively lock said front face member into one of a plurality of alternate rotated positions.

4. The feeder house of claim 3 wherein said stabilizing means further includes a plurality of bolts to interfit a corresponding number of said holes and corresponding apertures.

5. The feeder house of claim 4 wherein said front face member includes an offset section registerable with the main header beam.

6. The feeder house of claim 5 wherein said front face member is pivotably attached to said feeder house about said transverse axis such that said front face member can be rotated in a fore-and-aft direction to vary the cutting angle of the cutting means relative to the ground.

7. The feeder house of claim 6 wherein said cradle assembly includes a nesting portion registerable with the transverse main header beam for receiving same therewithin.

8. The feeder house of claim 7 wherein said header connecting means includes a locking means to lock the transverse main header beam into a preselected position within said nesting portion.

9. The feeder house of claim 8 wherein said locking means includes two laterally spaced spring loaded pins cooperable with the transverse main header beam.

10. The feeder house of claim 9 wherein said cradle assembly pivot means includes a housing affixed to said front face member, said housing having an opening extending fore-and-aft therethrough and a dowel rotatably positioned within said opening, said cradle assembly being supported by said dowel and pivotably rotatable therewith.

11. The feeder house of claim 10 wherein said pivot control means includes a screw device cooperatively mounted between said cradle assembly and said front face member on each side of said pivot means such that said screw device is selectively positionable to engage said cradle assembly and limit pivotal movement thereof in each respective direction.

12. The feeder house of claim 10 wherein said pivot control means includes a hydraulic cylinder operably mounted between said cradle assembly and said feeder house to selectively rotate said cradle assembly.

13. The feeder house of claim 10 wherein said nesting portion is registerable with said offset section, said pivot means being affixed to said offset section proximate to said centerline.

14. The feeder house of claim 13 wherein said offset section includes an inclined ramp on each side of said pivot means to support said nesting portion upon full rotation thereof to either side of said pivot means.

15. The feeder house of claim 14 wherein said cradle assembly has a slot shaped hole therein, said retaining means including a bolt and washer assembly cooperable between said front face member and said slot shaped hole to limit the fore-and-aft movement of said cradle assembly, said slot shaped hole having a size sufficient to permit rotation of said cradle assembly about said pivot means, said retaining means further including a spacer positioned between said front face member and said cradle assembly to maintain a slight distance therebetween.

16. The feeder house of claim 15 wherein said crop inlet opening is rectangular.

17. The feeder house of claim 16 wherein said cradle assembly is rotatable about said pivot means through an angular rotation of about 3½ degrees to each respective direction for a total allowable angular rotation in the range of between about 6 degrees and about 8 degrees, said front face member being rotatable in a fore-and-aft rotation through an arc having a central angle of about 10 degrees.

18. In a combine for harvesting crop material, said combine being attachable to a crop cutting and consolidating header including a transversely disposed cutting means for severing crop material from the ground and a frame having a transverse main beam for detachably supporting the header from said combine, said combine having a mobile base unit; a crop treating means housed within said base unit for treatment of said crop material; and a feeder house projecting forwardly from said base unit to interconnect the header and the crop treating means, said feeder housing including a forward end adjacent the header, a rearward end adjacent said crop treating means, two laterally spaced sidewalls extending between said forward and rearward ends, a centerline equidistantly positioned between said sidewalls, an apron conveyor operatively positioned between said sidewalls for transporting said crop material rearwardly to said crop treating means, and a crop inlet opening at said forward end for the passage of crop material to said crop conveying means, said apron conveyor including a transverse rotatable shaft member supporting, at least in part, said apron conveyor within said feeder house adjacent said forward end, said transverse shaft member defining a transverse axis, an improved feeder house comprising:
 a front face member pivotably mounted to said feeder house about said transverse axis for rotational movement in a fore-and-aft direction relative to said feeder house, said front face member including stabilizing means for controlling the extent of pivotal movement of said front face member; and
 a cradle assembly having a pivot means pivotably attaching said cradle assembly to said front face member, said cradle assembly having a crop passage opening therethrough substantially registered with said crop inlet opening, said cradle assembly including a header connecting means for attaching the header to said cradle assembly to prevent relative movement therebetween, a retaining means cooperable with said front face member to prevent relative force-and-aft movement therebetween while allowing pivotal movement of said cradle assembly in a substantially vertical plane and a pivot control means cooperatively associated with said cradle assembly and front face member for selectively controlling the extent of pivotal movement therebetween, whereby the header can be flexibly mounted to said combine for a lateral floating motion for following the contour of the ground and for a fore-and-aft motion to change the cutting angle of the header cutting means relative to the ground.

19. The combine of claim 18 wherein said cradle assembly includes a nesting portion registrable with the transverse main header beam for receiving same therewithin.

20. The combine of claim 19 wherein said header connecting means includes a locking means to lock the transverse main header beam into a preselected position within said nesting portion.

21. The combine of claim 20 wherein said locking means includes two laterally spaced spring loaded pins cooperable with the transverse main header beam.

22. The combine of claim 18 wherein said cradle assembly pivot means includes a housing affixed to said front face member, said housing having an opening extending fore-and-aft therethrough and a dowel rotatably positioned within said opening, said cradle assembly being supported by said dowel and pivotably rotatable therewith.

23. The combine of claim 22 wherein said pivot control means includes a screw device cooperatively mounted between said cradle assembly and said front face member on each side of said pivot means such that said screw device is selectively positionable to engage said cradle assembly and limit pivotal movement thereof in each respective direction.

24. The combine of claim 22 wherein said pivot control means includes a hydraulic cylinder operably mounted between said cradle assembly and said feeder house to selectively rotate said cradle assembly.

25. The combine of claim 18 wherein said front face member includes an offset section registrable with the main header beam.

26. The combine of claim 25 wherein said front face member includes a stabilizing means for selectively controlling the extent of rotational movement thereof.

27. The combine of claim 26 wherein said sidewalls include at least one hole therein, said front face member having side sheets extending rearwardly along said sidewalls, said side sheets having a plurality of apertures therein registerable with and corresponding to said at least one hole in said sidewall, said stabilizing means including a bolt interconnecting said at least one hole and the respective corresponding aperture to selectively lock said front face member into one of a plurality of alternate rotated positions.

28. The combine of claim 27 wherein said stabilizing means further includes a plurality of bolts to interfit a corresponding number of said holes and corresponding apertures.

29. The combine of claim 18 wherein said cradle assembly has a slot shaped hole therein, said retaining means including a bolt and washer assembly cooperable between said front face member and said slot shaped hole to limit the fore-and-aft movement of said cradle assembly, said slot shaped hole having a size sufficient to permit rotation of said cradle assembly about said pivot means, said retaining means further including a spacer positioned between said front face member and said cradle assembly to maintain a slight distance therebetween.

30. The combine of claim 29 wherein said nesting portion is registerable with said offset section, said pivot means being affixed to said offset section proximate to said centerline.

31. The combine of claim 30 wherein said offset section includes an inclined ramp on each side of said pivot means to support said nesting portion upon full rotation thereof to either side of said pivot means.

32. A combine for harvesting crop material comprising:
 a mobile base unit including a crop treating means for harvesting said crop material;
 a detachable header forward of said base unit, said header including a transversely disposed cutting means for severing said crop material from the ground, a rear endwall having a crop discharge opening therein and a frame having a transversely disposed main beam;

a feeder house projecting forwardly from said base unit for transferring crop material from said header to said crop treating means, said feeder house having a forward end adjacent the header, a rearward end adjacent the base unit, two laterally spaced sidewalls extending between said forward and rearward ends, a centerline equidistantly positioned between said sidewalls and a passageway extending from said forward end to said rearward end between said sidewalls, said passageway terminating in a crop inlet opening at said forward end and in a crop outlet opening at said rearward end;

a crop conveying means housed within said passageway for transporting crop material rearwardly to said base unit, said crop conveying means including a transverse rotatable shaft member adjacent and substantially parallel to said forward end, said shaft member defining a transverse axis substantially perpendicular to said centerline, said transverse axis being rearward of said header;

a front face member selectively movably attached to said feeder house for selective rotative movement in a fore-and-aft direction relative to said feeder house, said front face member projecting forwardly for connection to the cradle assembly set forth below such that the angular relationship of the header cutting means relative to the ground can be altered by rotatably moving said front face member in a fore-and-aft direction;

a cradle assembly having a pivot means pivotably attaching said cradle assembly to said front face member, said cradle assembly having a crop passage opening therethrough substantially registered with both said crop discharge opening and said crop inlet opening, said cradle assembly including a header connecting means for attaching said header to said cradle assembly to prevent relative movement therebetween, a retaining means cooperable with said front face member to prevent relative fore-and-aft movement therebetween while allowing pivotal movement of said cradle assembly in a substantially vertical plane and a pivot control means cooperatively associated with said cradle assembly and said front face member for selectively controlling the extent of pivotal movement therebetween;

a header lift means interconnecting said feeder house and said base unit for selectively vertically rotating said forward end about said rearward end such that said attached header is movable vertically relative to the ground; and drive means for driving said crop treating means, said crop conveying means, said header and said header lift means.

33. The combine of claim 32 wherein said cradle assembly includes a nesting portion registerable with the transverse main header beam for receiving some therewithin.

34. The combine of claim 33 wherein said header connecting means includes a locking means to lock the transverse main header beam into a preselected position within said nesting portion.

35. The combine of claim 34 wherein said front face member is pivotably attached to said feeder house about said transverse axis such that said front face member can be rotated in a fore-and-aft direction to vary the cutting angle of the cutting means relative to the ground.

36. The combine of claim 35 wherein said nesting portion is registerable with said offset section, said pivot means being affixed to said offset section proximate to said centerline.

37. The combine of claim 36 wherein said front face member includes a stabilizing means for selectively controlling the extent of rotational movement thereof.

38. The combine of claim 37 wherein said cradle assembly pivot means includes a housing affixed to said front face member, said housing having an opening extending fore-and-aft therethrough and a dowel rotatably positioned within said opening, said cradle assembly being supported by said dowel and pivotably rotatable therewith.

39. The combine of claim 38 wherein said front face member includes an offset section registerable with the main header beam.

40. The combine of claim 39 wherein said sidewalls include at least one hole therein, said front face member having side sheets extending rearwardly along said sidewalls, said side sheets having a plurality of apertures therein registerable with and corresponding to said at least one hole in said sidewall, said stabilizing means including a bolt interconnecting said at least one hole and the respective corresponding aperture to selectively lock said front face member into one of a plurality of alternate rotated positions.

* * * * *

UNITED STATES PATENT OFFICE
CERTIFICATE OF CORRECTION

Patent No. 4,266,391          Dated  May 12, 1981

Inventor(s)  James W. McDuffie, et al

It is certified that error appears in the above-identified patent and that said Letters Patent are hereby corrected as shown below:

On the cover page of the patent where the names of the inventors are listed with their addresses, the names and addresses of the inventors should be changed from "James W. McDuffie; Larimer J. Knepper; Larimer J. Knipper, all of New Holland, Pa." to -- James W. McDuffie; Larimer J. Knepper; Robert A. Wagstaff, all of New Holland, Pa.--.

Signed and Sealed this

Twenty-eighth Day of July 1981

[SEAL]

Attest:

GERALD J. MOSSINGHOFF

Attesting Officer     Commissioner of Patents and Trademarks